May 22, 1934.   C. W. KING   1,959,431
TIRE SPREADER
Filed June 17, 1933   2 Sheets-Sheet 2
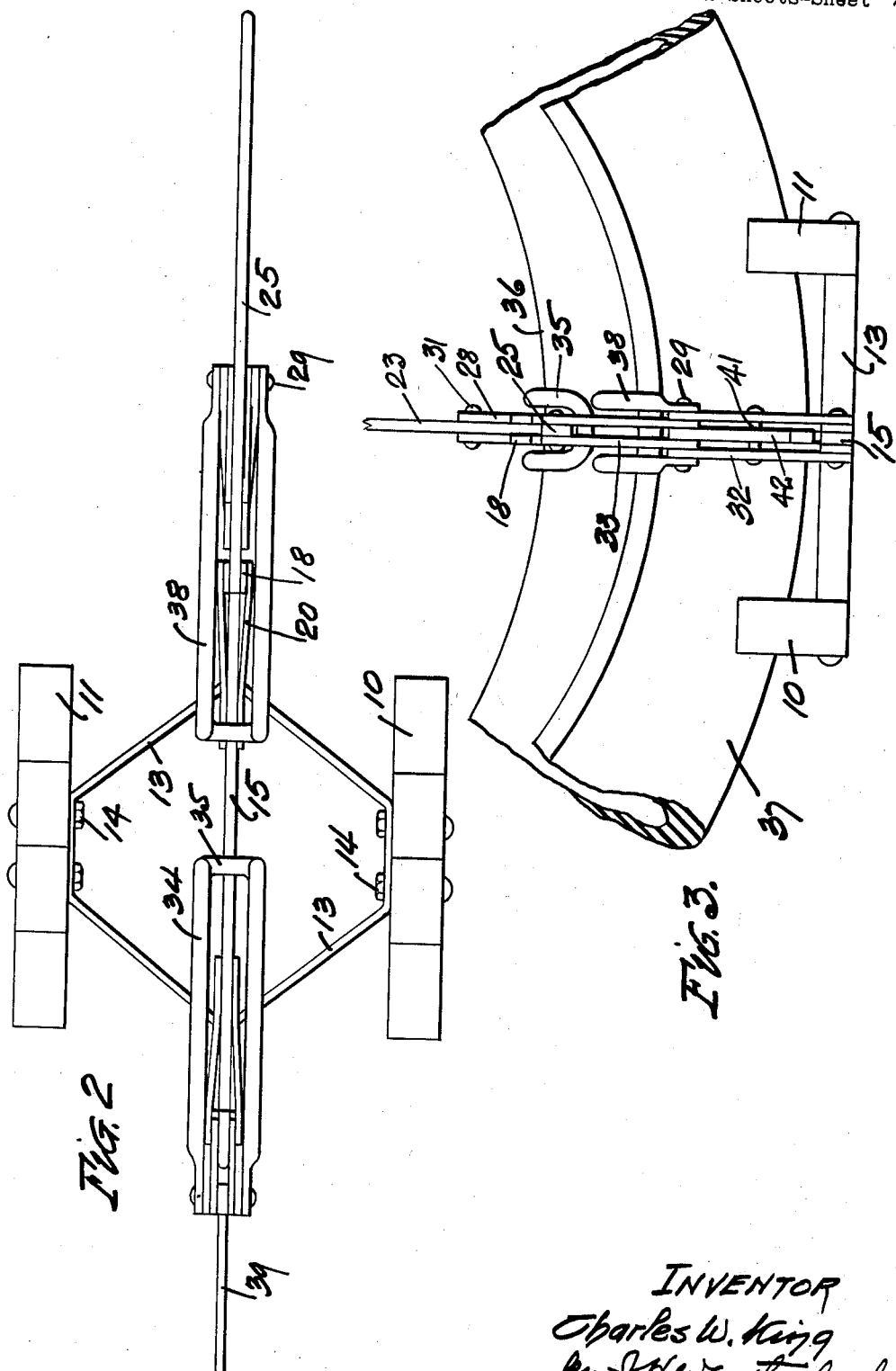
INVENTOR
Charles W. King
by J. H. Weatherford
Atty.

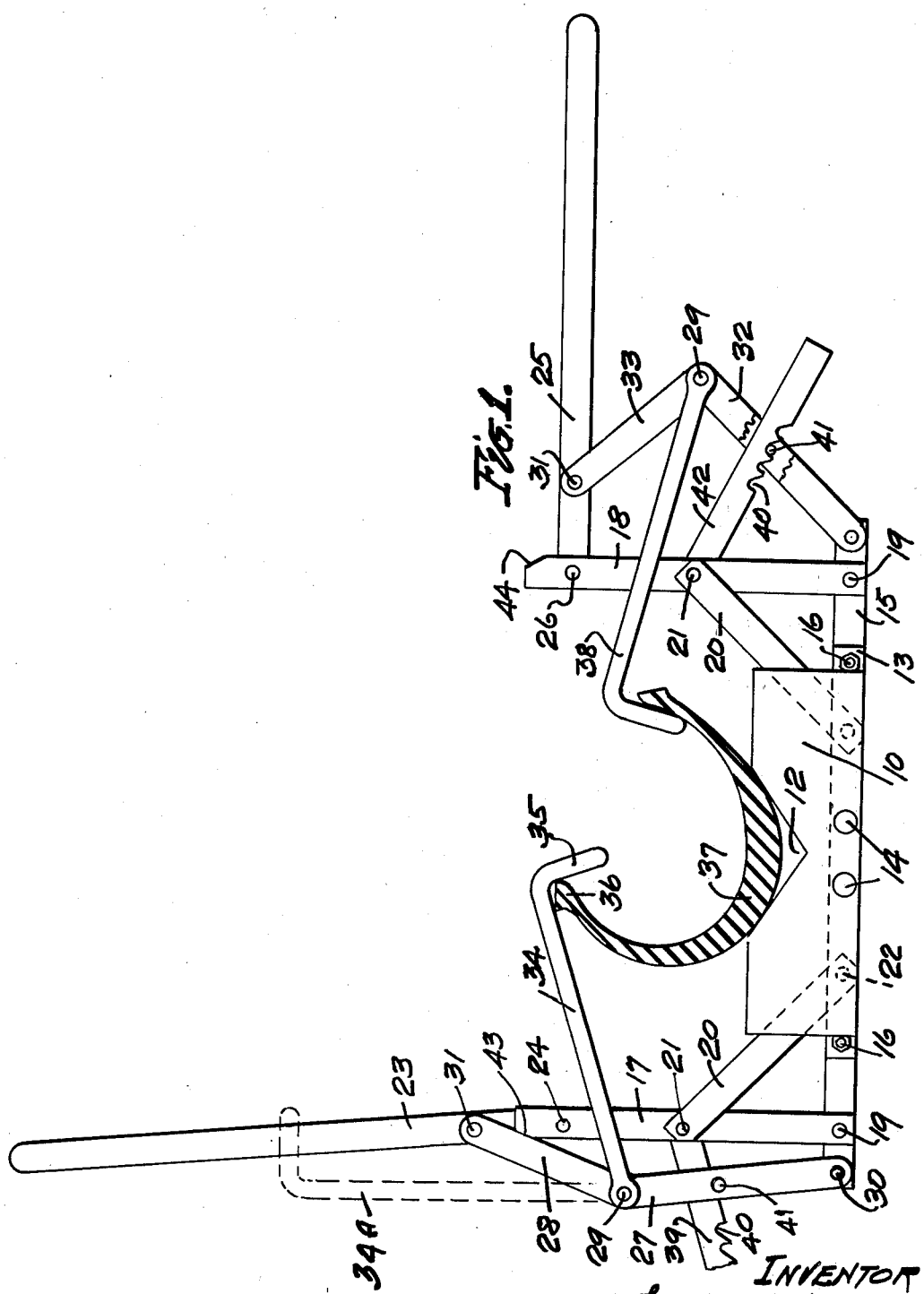

Patented May 22, 1934

1,959,431

UNITED STATES PATENT OFFICE 1,959,431

TIRE SPREADER

Charles W. King, Memphis, Tenn., assignor of one-half to Gilbert M. Seewald, Memphis, Tenn.

Application June 17, 1933, Serial No. 676,307

4 Claims. (Cl. 152—27)

This invention relates to improvements in a device adapted to engage portions of the casings of pneumatic tires whereby to open them up and facilitate access to the inner surface of the tire, so as to facilitate the examination and repair thereof.

Automobile tires are often punctured or otherwise damaged, and it becomes important to make a careful inspection of the inner surface in order to locate the damage done or that which caused the damage. In order to do this it is extremely advantageous to spread the tire, make an examination where it is spread, shift the tire, respread it, re-examine and continue the operation until all portions of the interior have been examined, and all trouble located. After locating trouble it is often desirable to hold the tire in spread position in order to more readily make the repair. In placing and holding a tire precedent to spreading and/or in shifting the tire in order to examine other portions thereof, it is difficult to support and steady the tire in proper position, and also to so support it that shifting can readily be accomplished and yet the tire be still supported.

The objects of the present invention are:

To provide means for supporting a tire precedent to spreading;

To provide means for supporting a tire which will permit shifting thereof while in supported position;

To provide means for engaging the beads of a tire for spreading it apart;

To provide means for spreading a tire apart in which the power applied for spreading action increases as the resistance increases;

To provide means whereby one side of the tire may be spread while holding the other side thereof;

To provide means for holding the tire after it has been spread; and

Generally, to improve the design and construction of such a device.

The means by which the foregoing and other objects are accomplished and the manner of their accomplishment will readily be understood from the following specification on reference to the accompanying drawings, in which:—

Fig. 1 is a side elevation of the device showing the cross section of an automobile tire in place;

Fig. 2 is a corresponding plan view; and

Fig. 3 is an end elevation.

Referring now to the drawings in which various parts are indicated by numerals, 10 and 11 are a pair of blocks spaced apart each having a shallow V shaped trough 12 in the upper surface thereof. These blocks are held in spaced relation by a diamond shaped frame 13 which is secured to the blocks as by bolts 14. 15 is a base bar disposed parallel to the blocks 10 and 11 and projecting laterally beyond the frame 13, the opposite halves of the frame being secured to this bar as by bolts 16. The blocks 10 and 11, diamond shaped frame 13, and bar 15 form the base for the machine.

Secured to the base bar 15 at equal distances from the center of the troughs 12, are a pair of posts 17, 18, each preferably comprising a pair of flat bars which are secured to the bar as by rivets 19. These posts are respectively braced by diagonal bracing members 20 which are secured to their respective posts as by rivets 21 and at their lower ends to the bar 15 as by rivets 22. 23 is a lever pivoted to the upper end of the post 17 on a pin 24, and 25 a similar lever pivoted on a similar pin 26 in the post 18. 27, 28 are a pair of toggle arms pivotally connected by a pin 29 and having their lower and upper ends respectively pivotally connected as by a pin 30 to the base-bar 15, and as by a pin 31 to the lever 23. A similar pair of toggle arms 32, 33 are similarly connected to the opposite lever and base-bar. A link 34 is pivotally connected, by the pin 29, to the toggle arms 27, 28 this link having a downwardly turned end 35 for engaging the bead 36 of an automobile tire 37. A similar link 38, is similarly connected to the opposed toggle arms 32, 33. Pivotally connected to the post 17 as by the pin 21 is a latch bar 39 having notches 40, adapted to engage a pin 41 on the toggle link 27, a similar bar 42 being provided for the opposite side of the device. The posts 17 and 18, extend above the pivot pins 24 and 26 and have beveled portions 43, 44 respectively against which the toggle links 28, 33 engage to limit their movement.

In removing or placing a tire the links 34, 38 may be turned out of the way as indicated by the dotted position 34A, of the link 34.

In using the device the automobile tire is placed in position on the blocks 10 and 11, the shallow troughs in these blocks engaging tires of varying sizes and supporting and steadying a tire so placed thereon. A tire so placed may be readily shifted to move various portions thereof successively into working relation to the spreader. With the tire placed, links 34 and 38 are swung down into opposed engagement with the opposite beads of the tire as shown by the position of the link 34 in Fig. 1. One or both of the levers, as the lever 25 of Fig. 1 is swung outward and downward causing the toggle arms to move the link 38 outward and spread the side of the tire. During such movement the pin 41 engages the notches 40 of the latch 42 and holds the toggle arms in position. The opposite arm 23 may then be similarly moved and the tire is ready for examination. To release a tire pressure is exerted by hand on a lever and the latch holding it is lifted, usually by the operator's foot to effect the unlatching operation.

It will be noted that if only one lever be depressed that side of the tire is opened for examination without shifting of the tire, and that as the tire is spread and resistance becomes greater the pin centers 26, 31, 29 more nearly approach a straight line and greater pressure is thereby exerted.

Having described my invention, what I claim is:—

1. In a tire spreader, a base carrying a pair of troughed supports laterally spaced apart, opposed posts, longitudinally spaced apart, secured to, extending upward and braced from said base, and opposed spreading means, each comprising a lever pivotally secured to the upper portion of one of said posts, toggle arms, pivotally connected, having their opposite ends pivotally connected respectively to said base and said lever, and a hooked link pivotally connected to the common pin of said arms.

2. In a tire spreader, a base, opposed posts spaced apart, secured to, extending upward and braced from said base, and opposed spreading means, each comprising a lever pivotally secured to the upper portion of one of said posts, toggle arms, pivotally connected, having their opposite ends pivotally connected respectively to said base and said lever, and a hooked link pivotally connected to the common pin of said arms.

3. In a tire spreader, a base, opposed posts spaced apart, carried by said base, and spreading means, each comprising a lever pivotally secured to the upper portion of one of said posts, toggle arms, pivotally connected, having their opposite ends pivotally connected respectively to said base and said lever, and a hooked link pivotally connected to the common pin of said arms.

4. In a tire spreader, a base carrying a pair of troughed supports laterally spaced apart, opposed supports longitudinally spaced, secured to and extending upward from said base, and opposed spreading means, each comprising a lever pivotally secured to one of said supports, toggle arms, pivotally connected, having their opposite ends pivotally connected respectively to said base and said lever, and a hooked link pivotally connected to the common pin of said arms.

CHARLES W. KING.